United States Patent [19]
Fabry

[11] 3,823,366
[45] July 9, 1974

[54] SYSTEM FOR TESTING SOLENOID RESPONSE TIME UNDER LOAD AND HOLDING POWER UNDER INCREASING LOAD CONDITIONS

[75] Inventor: Donald F. Fabry, Garden City, Mich.

[73] Assignee: Burroughs Corporation, Detroit, Mich.

[22] Filed: Mar. 26, 1973

[21] Appl. No.: 345,181

[52] U.S. Cl. ............ 324/28 R, 317/123, 324/73 AT
[51] Int. Cl. ............................................. G01r 31/02
[58] Field of Search ...... 324/28 R, 73 AT; 317/123, 317/124

[56] References Cited
UNITED STATES PATENTS
| | | | |
|---|---|---|---|
| 3,276,579 | 10/1966 | Dluzen et al. | 324/28 R X |
| 3,548,301 | 12/1970 | Zutkis | 324/28 R |
| 3,560,844 | 2/1971 | Brown | 324/28 R |
| 3,668,516 | 6/1972 | Muraoka | 324/28 R |
| 3,681,681 | 8/1972 | Auslander | 324/28 R |

Primary Examiner—Stanley T. Krawczewicz
Attorney, Agent, or Firm—Michael B. McCurry; Edwin W. Uren; Paul W. Fish

[57] ABSTRACT

Solenoids of varying specifications may be tested for push or pull in either a horizontal or a vertical position by means of this system. Included within the test system are: a fixture for receiving solenoids of varying dimensions, a magnetic clutch to transmit the torque of a motor into a test load for the solenoid, circuitry to control the testing of the solenoid, and circuitry responsive to the test environment to automatically determine whether the solenoid has passed or failed predetermined test specifications. The solenoid is first tested for time response under load and then is tested for holding power under an increasing load. These tests are performed automatically and in addition indicating lights are provided to indicate to an operator whether the solenoid has passed or failed the tests.

17 Claims, 12 Drawing Figures

SYSTEM FOR TESTING SOLENOID RESPONSE TIME UNDER LOAD AND HOLDING POWER UNDER INCREASING LOAD CONDITIONS

BACKGROUND OF THE INVENTION

Prior to the development of the disclosed apparatus, the testing of solenoids was generally accomplished by testing one aspect of operation at a time. For instance, the solenoid might be tested for holding power by supporting a known weight for a specified length of time, or the response time for a solenoid could be tested by timing the individual response of a solenoid against a known load. Additionally, the prior art usually provided for testing a solenoid only in a horizontal or vertical plane which may or may not have been consistent with the orientation of the solenoid in actual use. The more usual case was to test a solenoid in the vertical plane since it was easy to load the solenoid by placing weights on the armature. However, there was no single integrated test device to measure both the time response of a solenoid against a predetermined load and the holding power of the solenoid against a specified load. Further, since much of the current generation of electronic and electromechanical equipment operates under tight tolerances, highly accurate test procedures are necessary.

Since the testing in the above manner of a large number of solenoids to be used in equipment being produced in quantity is a time consuming and expensive operation, an economical way of accurately testing a large variety of solenoids in a production environment that minimized the amount of human intervention became highly desirable. The present device fulfills these criteria by permitting the automatic and rapid testing of solenoids of differing specifications wherein the operator only has to note the pass/fail lights to determine whether the individual solenoid conforms to the manufacturer's specifications.

SUMMARY OF THE INVENTION

It is accordingly an important object of the present invention to provide a means of one step testing of both the response and the load holding capability of a plurality of solenoids of differing specifications.

It is a further object of the invention to provide a means of loading a solenoid under test by means of a constant speed motor operating through a magnetic clutch.

It is an additional object of the invention to provide circuitry that will automatically determine when a solenoid has passed predetermined tests and to light lamps that would indicate the pass/fail condition of the solenoid to an operator.

The invention first includes a fixture support member that may be orientated in either a horizontal or a vertical plane in order to conform to the ultimate use of the solenoid. On the fixture support member is mounted a fixture for receiving the solenoid under test wherein the fixture is adjustable by various mechanical means to accept a wide variety of physically distinct solenoids. Additionally, the test bed provides support for a constant speed motor that drives a magnetic clutch. One end of a connecting arm or force transmitting member is attached to the solenoid and the other end is connected to the magnetic clutch. The direction of the load on the solenoid will be generated depending upon whether the solenoid is to be tested for pushing or pulling. In addition, mechanical means including a dial indicator is provided to accurately adjust the gap for the particular solenoid to be tested. The primary purpose of the magnetic clutch is to provide a means for converting the torque of the motor into either a pushing or a pulling load for the solenoid, the direction of the load being governed by the direction of rotation of the motor. Also included in the test system are a plurality of limit switches to measure the amount of travel of the solenoid. These limit switches take the form of photoelectric cells in the preferred embodiment.

Appropriate logic circuitry is provided to control the load on a solenoid by controlling the current through the magnetic clutch and to provide for activation of the solenoid at and for a specified time. Additional timing circuitry is provided to compare the response time of the solenoid to preset specifications thereby testing the response of the solenoid under a predetermined load. Also, there is circuitry to provide for increasing the load on the solenoid by increasing the current in the magnetic clutch up to a certain specified value to represent the upper limit of a load on the solenoid. Integral with this logic circuitry are indicating means to light a "pass" lamp if the solenoid performs up to specifications. Further timing and logic circuitry is included in the indicating means to light a "fail" lamp if the solenoid fails to hold the load and to light an "operate fail" lamp when the solenoid fails to respond within the predetermined time. These circuits are provided with variable elements to provide for operator settings of loads and specific time responses so as to be able to test a plurality of solenoids with differing specifications.

To summarize the operation of the automatic solenoid tester, first the solenoid to be tested is placed within the fixture on the test bed and the test bed is secured in either the vertical or horizontal plane. Exact adjustment of the desired gap, distance of travel of the solenoid, is provided for by using the dial indicator. Test parameters are then input to the system by adjusting the various elements of the test circuitry. These parameters includes: whether a push or pull load will be placed on the solenoid, the magnitude of the initial load over which the solenoid must respond, the time limit of response and the upper limit of the load which the solenoid must hold. A signal is then applied to the solenoid at the same time a signal is applied to the timed circuitry of the apparatus. If the solenoid responds under the initial load within the specified time thereby closing the appropriate limit switch and if the solenoid is able to hold the maximum specified load the pass light will light on. However, if the solenoid is unable to overcome the initial load within the required time, the operate-fail lamp will light thereby indicating to the operator that the solenoid was unable to respond within the specified time limit. If the solenoid is unable to hold the load against the increasing load as it approaches its upper limit, the fail lamp will be turned on indicating that the solenoid has failed the test. This sequence of tests will be carried on automatically by the systems circuitry.

DETAILED DESCRIPTION OF THE INVENTION

The invention will be discussed in two parts. First, the mechanical portion or test apparatus including the test bed, motor, magnetic clutch and solenoid fixture and then secondly, the control and logic portion of the invention.

Figures 1, 2:
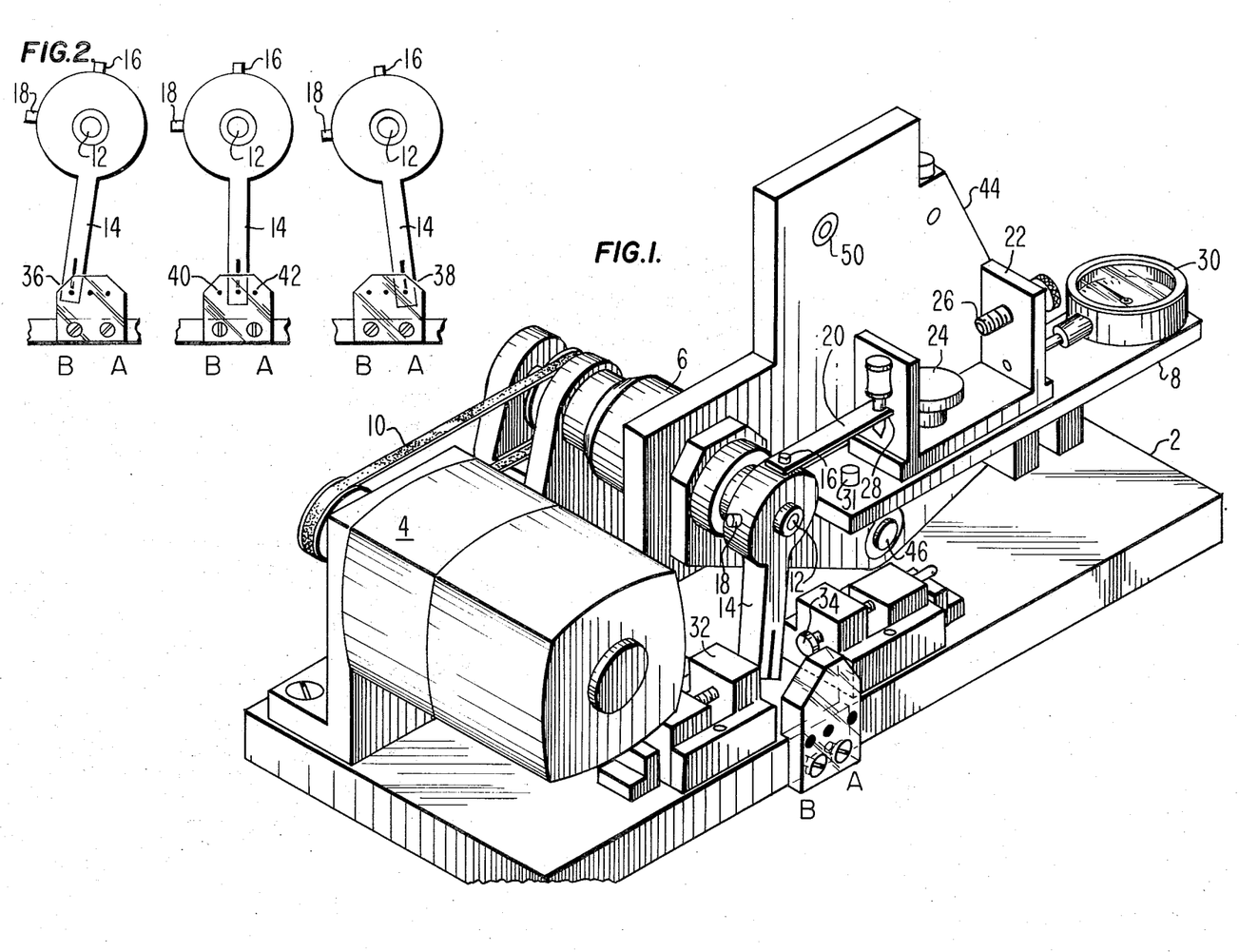
FIG. 1 is a perspective view of the solenoid test apparatus.
FIG. 2 is a diagram of the three positions of the actuator arm.

FIG. 1 provides a perspective view of the preferred embodiment of the test apparatus. Since one of the major problems in testing solenoids is to provide a load that will simulate the load on the solenoid in its ultimate product environment, the apparatus of FIG. 1 was developed to translate and govern the force of an electric motor into a linear force that could be applied to the solenoid. The test bed or main support frame 2 provides support for the various mechanical portions of the apparatus such as the motor 4, the magnetic clutch 6 and the fixture support member 8. In the preferred embodiment of the invention the motor 4 is a constant speed electric motor that drives the magnetic clutch 6 by means of the belt 10. The force generated by the magnetic clutch is then transmitted on the shaft 12 to the actuator arm 14 and the direction of the force so generated is dependent on the direction of rotation of the motor A. The amount of force developed by the clutch 6 is governed by the current applied to the clutch as will be explained in detail in the logic portion of this disclosure. Integral with the actuator arm 14 are a plurality of pins, two of which, 16 and 18, are illustrated in FIG. 1, that serve as attachment points for the connecting arm or force transmission member 20. The connecting arm serves to connect the actuator arm with the solenoid under test. It is by means of these elements: the belt 10, the magnetic clutch 6, the actuator arm 14, and the connecting arm 20 that the rotational force of the motor 4 is translated into a linear force or test load on the solenoid.

Since solenoids are most often tested for two capabilities: first to overcome a specified load within a specified amount of time and secondly to hold a greater load, the magnetic clutch 6 must be energized to produce two separate torques on the actuator arm 14. For purposes of this disclosure the first torque, the torque that the solenoid will overcome in moving the actuator arm 14, will be designated as torque "A". The second or holding torque will be designated as torque "B".

The solenoid is secured in the fixture 22 by the various mechanical means illustrated in FIG. 1. The solenoid is not shown in FIG. 1 so that the mechanical means 24 and 26 for adjusting and securing the fixture to accept solenoids of varying physical dimensions may be more clearly illustrated. The connecting arm 20 is secured to the armature of the solenoid at point 28.

Also illustrated in FIG. 1 is the dial indicator 30 that is used in the preferred embodiment to adjust the position of the fixture 22 on the fixture support member 8 within very high tolerances so that the gap, or length of travel of the solenoid armature may be provided for with a high degree of accuracy.

The limit post 31 provides a stop to limit the travel of the fixture 22 and in addition provides an alternate point from which the gap may be measured.

As can be seen from FIG. 1, the motion of the solenoid under test will be transmitted by the connecting arm 20 to the actuator arm 14 wherein the travel of the actuator arm will be limited by the stops 32 and 34. When the solenoid is in an extended position the actuator arm 14 will be adjacent to or abut stop 34 and similarly when the solenoid under test is in a retracted state the actuator arm 14 will be adjacent to or abut the stop 32.

In FIG. 2 is illustrated the positions that the actuator arm may take in response to the action of the solenoid under test. For the purposes of this disclosure the position of the actuator arm when the armature of the solenoid is in a retracted position will be labeled as point B as shown at 36 of FIG. 2, and when the armature of solenoid under test is in an extended state as shown at 38 of FIG. 2 the position of the actuator arm will be labeled point A.

In the preferred embodiment the elements 40 and 42 represent photoelectric cells that are used to indicate to the logic circuitry the location of the actuator arm. However, this function can also be accomplished by placing limit switches within the stops 32 and 34 of FIG. 1.

It is one of the basic objectives of the apparatus shown in FIG. 1 to provide a means of supporting the solenoid in either a horizontal or vertical plane. This is desirable so as to provide a test environment for the solenoid that will simulate the actual position of the solenoid in the final product.

Figure 3:
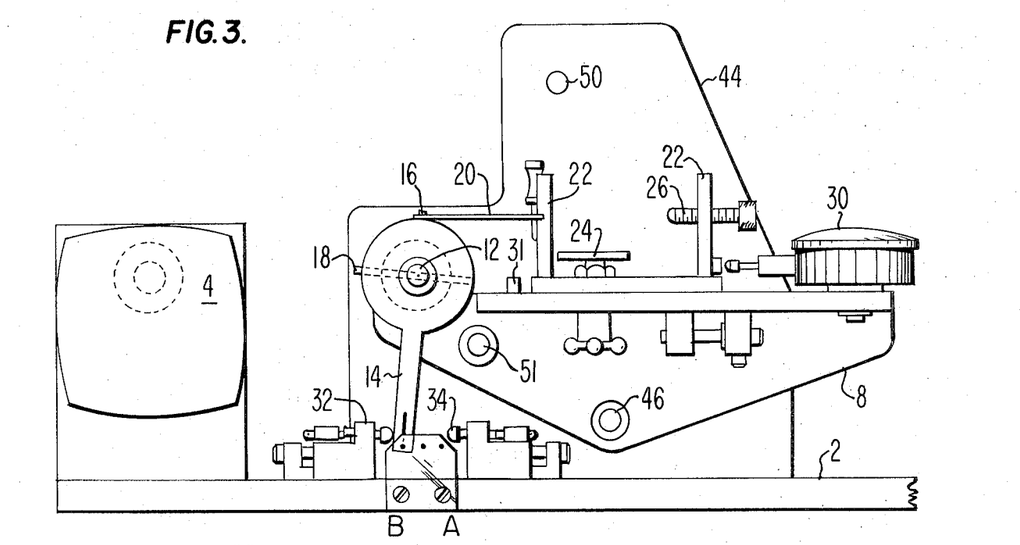
FIG. 3 is a frontal view of the solenoid test apparatus with the fixture support member in a horizontal position.
Figures 4, 4A:
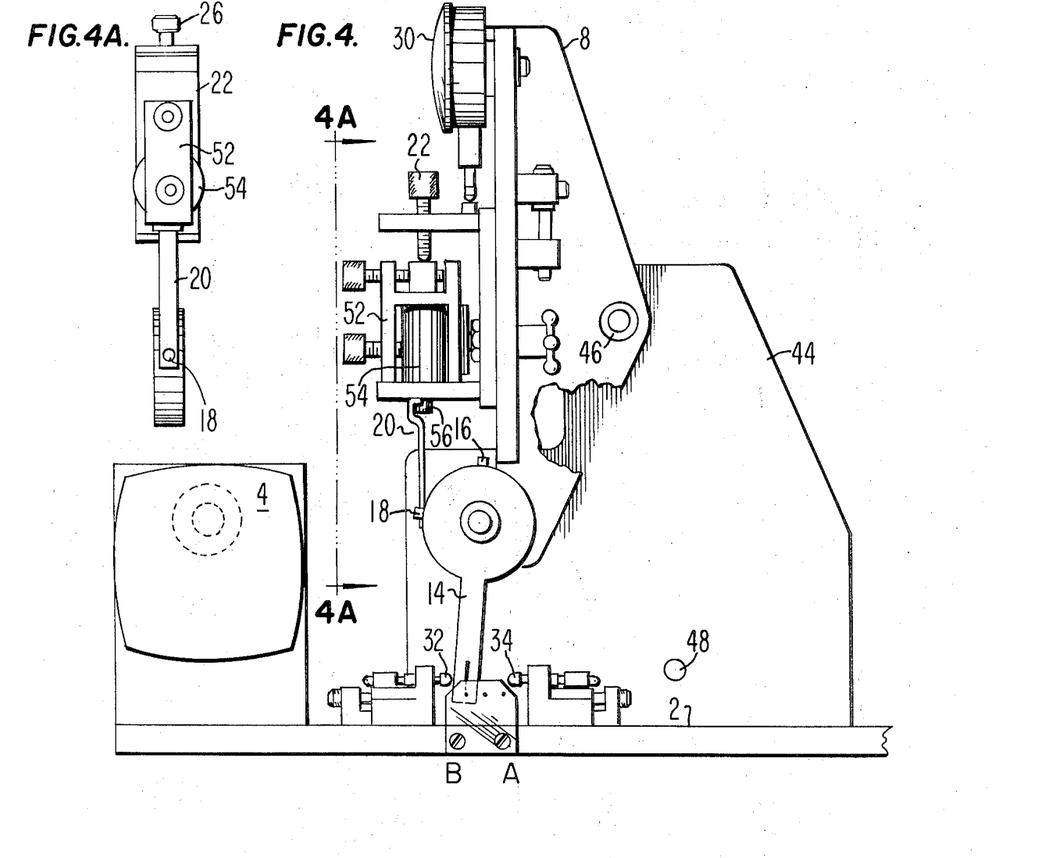
FIG. 4 is a frontal view of the solenoid test apparatus with the fixture support member in a vertical position.
FIG. 4A is a top view of the solenoid fixture and the connecting arm.

In FIGS. 3 and 4 respectively are shown positions of the fixture support member 8 that will allow the solenoid to be tested in either a horizontal plane or a vertical plane. The fixture support member is secured to the test bed 2 on the vertical support portion 44, which is integral with and secured to the test bed 2. As is illustrated in FIGS. 3 and 4, the fixture support member has two positions; the horizontal in FIG. 3 and the vertical in FIG. 4. The fixture support member is secured in the horizontal plane, FIG. 3, by means of a fastening device 46, such as a nut and bolt. The fastening device extends through the fixture support member 8 and the vertical support portion 44 operative to secure the fixture support member and hence the fixture 22 in the horizontal plane. When the fixture support member is in the horizontal position as shown in FIG. 3, the securing device 46 will be inserted through the aperture 48, as shown in FIG. 4, in the vertical support portion 44. Likewise, when the fixture support member 8 and hence the fixture 22 are in the vertical position as shown in FIG. 4, the fastening device 46 will be inserted through the aperture 50 in the vertical support portion 44. Although not shown in any of the Figures, it will be appreciated that the fixture support frame 8 can take any of a plurality of positions between the horizontal and vertical planes by providing apertures in the appropriate locations on the vertical support portion 44. An additional securing device 51 is used in the preferred embodiment to help secure the fixture support frame 8 to the vertical support portion 44 in order to reduce binding on the clutch 6.

FIGS. 3 and 4 also serve to illustrate the attachment of the connector arm 20 to the pin 16 on the actuator arm 14 when the fixture support member 8 is in the horizontal position and similarly the connection of the connection arm 20 to pin 18 of the actuator arm when the fixture support member is in the vertical position. In addition, FIG. 4 shows an additional fixture adjustment device 52 that may be used to further align and hold steady the solenoid under test. Within the fixture adjustment device 52 is illustrated a typical solenoid 54 which has its armature 56 connected to the connecting arm 20.

Logic and Control Circuitry

Figure 5:
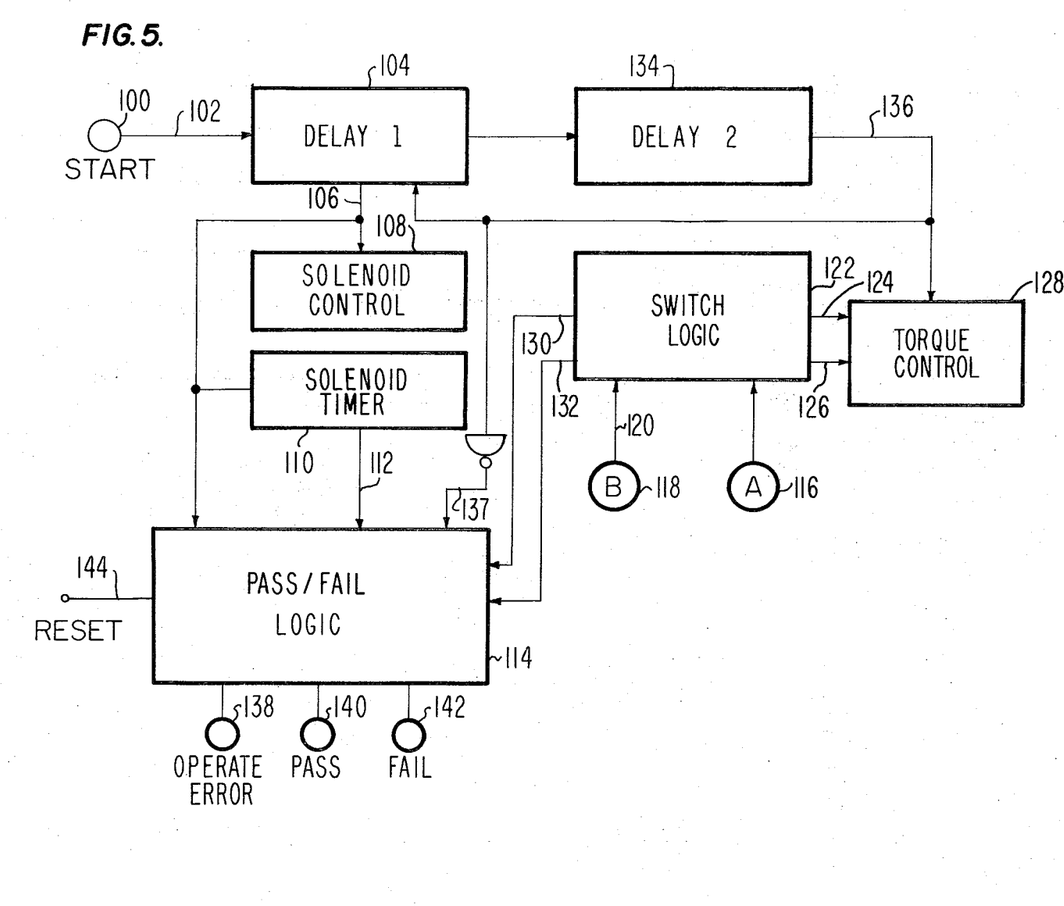
FIG. 5 is a block diagram of the solenoid test circuitry.

A block diagram of the logic and control circuitry for the preferred embodiment of the solenoid tester is shown in FIG. 5. The terminal 100 labeled START represents the point in the circuitry where the testing process for a solenoid is initiated. The start signal is transmitted on the line 102 to the first time delay circuit which is represented by the box 104 labeled DELAY 1. The primary purpose of the timing circuitry in DELAY 1 is to delay the triggering of the solenoid sufficiently to allow the transient signals in the logic circuitry to disappear. After this predetermined amount of time has elapsed, as governed by the circuitry of DELAY 1, a signal will be transmitted on line 106 of the Solenoid Control circuitry. The Solenoid Control circuitry 108 essentially functions to trigger the solenoid under test upon receiving the signal over line 106. This first timing signal transmitted on line 106 is also transmitted to the Solenoid Timer circuitry 110 which will generate a signal on line 112 when the time specified for the solenoid to respond has elapsed. This signal on line 112 is then transmitted to the PASS/FAIL LOGIC circuitry 114.

Assuming for purposes of illustration that the test being performed on the solenoid is a pull test, the apparatus will be initially set up with the actuator arm 14 of FIG. 1 covering the photoelectric cell A,42, as represented by the terminal A 116 of FIG. 5. At the same time the photoelectric cell B, terminal 118, will be uncovered, thus generating a signal on line 120 which indicates to the Switch Logic 122 the relative position of the actuator arm 14. Signals indicating the required torque are sent from Switch Logic 122 over lines 124 and 126 to the Torque Control unit 128. It is the Torque Control unit 128 that serves to control the current to the magnetic clutch, thereby generating the desired torque for the test. Returning to the Switch Logic 122, another function of this logic circuitry is to shift the torque from the beginning torque "A" to the holding torque, torque "B", when the actuator arm has shifted from the A position 38 of FIG. 2 to the B position 36 of FIG. 2. This occurs when the solenoid has successfully overcome torque "A". This shift will be signaled by the photoelectric cells 118 and 116. After the shift has taken place the switch logic 122 will cause the Torque Control unit to shift to the holding torque. In addition, a signal indicating the type of torque, "A" or "B", will be transmitted from the Switch Logic 122 over lines 130 and 132 to the PASS/FAIL LOGIC 114.

The time delay circuit, DELAY 2, as represented by block 134 of FIG. 3, serves to delimit the time for the entire test procedure. After the predetermined time for the test has elapsed, the DELAY 2 circuitry will generate a signal on line 136 that will reset the time delay circuit DELAY 1 and indicate to the PASS/FAIL LOGIC 114 that the time for the test is over. In the preferred embodiment the signal on line 136 is inverted on line 137 before entering the PASS/FAIL LOGIC.

Integral with and driven by the PASS/FAIL LOGIC 114 are three test lamps: the Operate Error lamp 138, the Pass lamp 140, and the Fail lamp 142. If the solenoid is unable to shift the actuator arm to position B within the specified time as measured in the Solenoid Timer 110, the Operate Error lamp 138 will light. If, on the other hand, the solenoid is able to respond within the predetermined time as measured by the Solenoid Timer 110, but is unable to hold the second torque or torque "B", the fail lamp 142 will light. In the event that the solenoid is able to pass both tests, the Pass lamp 140 will light, thereby indicating to the operator that the solenoid meets all of the predetermined specifications.

In the preferred embodiment, a reset signal means 144 is also provided so that an operator may prepare the circuitry to test another solenoid by missing one button.

Figure 6:
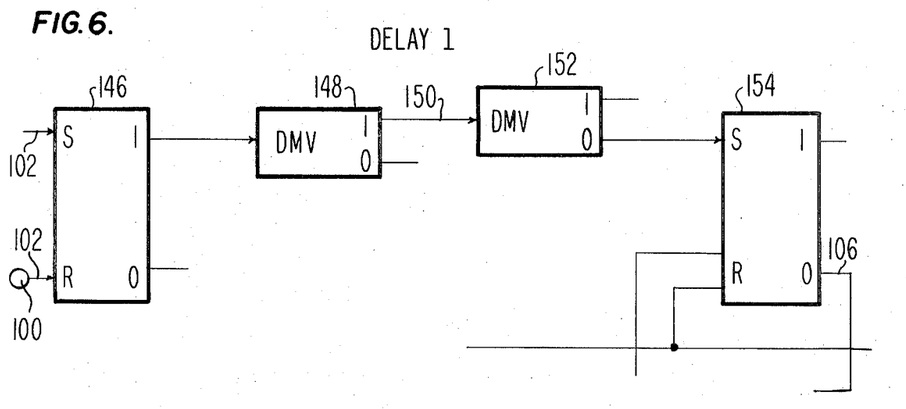
FIG. 6 is a schematic of the first time delay circuitry.

The following will be a detailed discussion of each of the elements of the preferred embodiment of the invention as shown in FIG. 5. First, the time delay circuitry, DELAY 1, as shown at 104 of FIG. 5 will be discussed. The logic elements making up the time delay circuit, DELAY 1, are shown in FIG. 6. Upon receipt of the start signal over line 102 the flip-flop 146 will trigger the DELAY multivibrator 148 which will generate a high signal on line 150 for approximately 2 milliseconds thereby triggering the second delay multivibrator 152 2 milliseconds after the receipt of the start signal 100. When the second delay multivibrator 152 of FIG. 6 goes low it will act to set the flip-flop 154 and generate a high signal or a "one" on line 156. At the same time the flip-flop 154 will generate a low signal or a "zero" on the line 106. In summary, the delay circuit of FIG. 5 will respond to the start signal 100 by generating a high signal on line 156 and a low signal on line 106 approximately 2 milliseconds after the start signal 100 has been received thereby providing time for various circuit transients to settle down.

Figure 7:
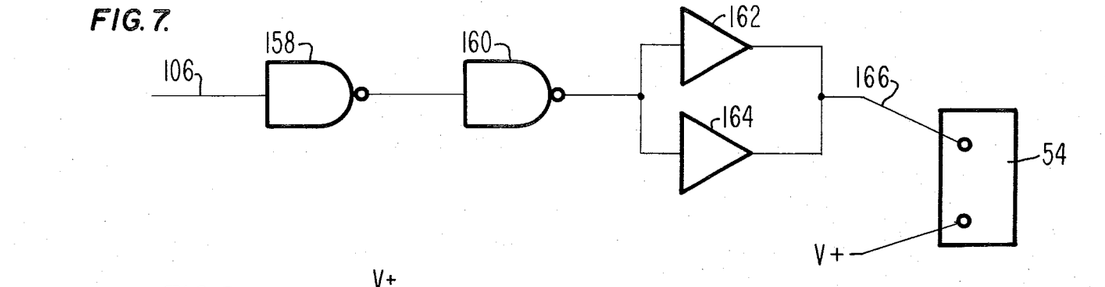
FIG. 7 is a schematic of the solenoid control circuitry.

The low signal thus generated by the time delay circuitry, DELAY 1, is transmitted over line 106 to the Solenoid Control circuitry as shown at 108 of FIG. 5. The logic elements that make up the solenoid control circuitry 108 are set forth in FIG. 7. When the low signal is generated on line 106 it will be transmitted through the two inverter gates 158 and 160 to the solenoid driving amplifiers 162 and 164. It is this low signal over line 106 that activates the solenoid driving amplifiers which will in turn activate the solenoid under test 56 by placing a ground on line 166.

Figure 8:
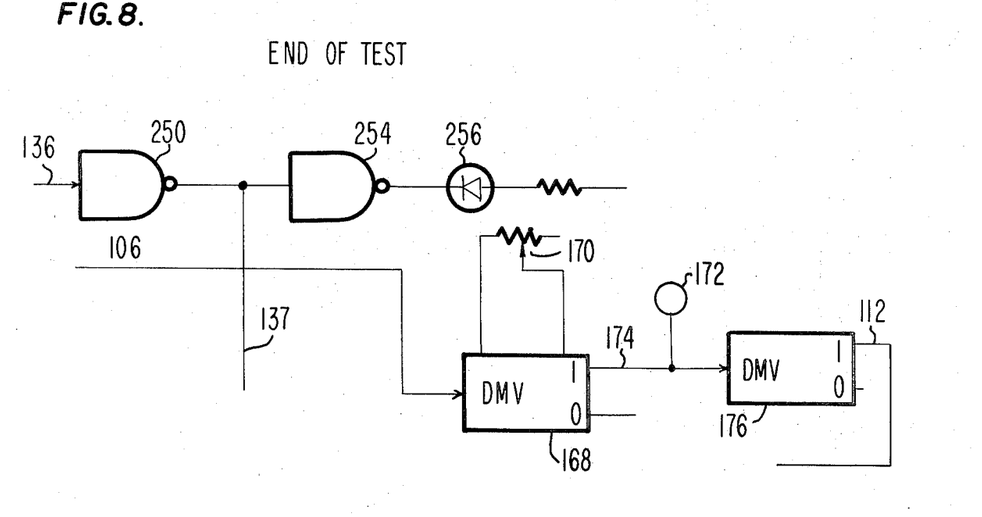
FIG. 8 is a schematic of the solenoid timing circuitry.

The low signal generated by DELAY 1 on line 106 also activates the Solenoid Timer circuitry 110. The logic elements that make up this circuitry are set forth in FIG. 8. In the preferred embodiment of the invention the first delay multivibrator 168 of FIG. 8 will be selected so as to be adjustable for a plurality of time delays. This adjustment is shown at 170 of FIG. 8. In addition, illustrated in FIG. 8 is a terminal 172 where an oscilloscope or a similar device may be attached so as to adjust the delay multivibrator 168 for the precise response time that has been specified for the solenoid under test. As soon as a low signal is received over line 106 from the DELAY 1 circuitry 104, the delay multivibrator 168 will produce a high signal on line 174 for the specified length of time that the solenoid under test has to respond. After the specified length of time, which may be for example from zero to 100 milliseconds, a low signal will be produced on line 174. This will trigger the second delay multivibrator 176, producing a high signal on line 112. It is by means of the circuitry illustrated in FIG. 8 that time constraints for the solenoid under test may be generated.

Figure 9:
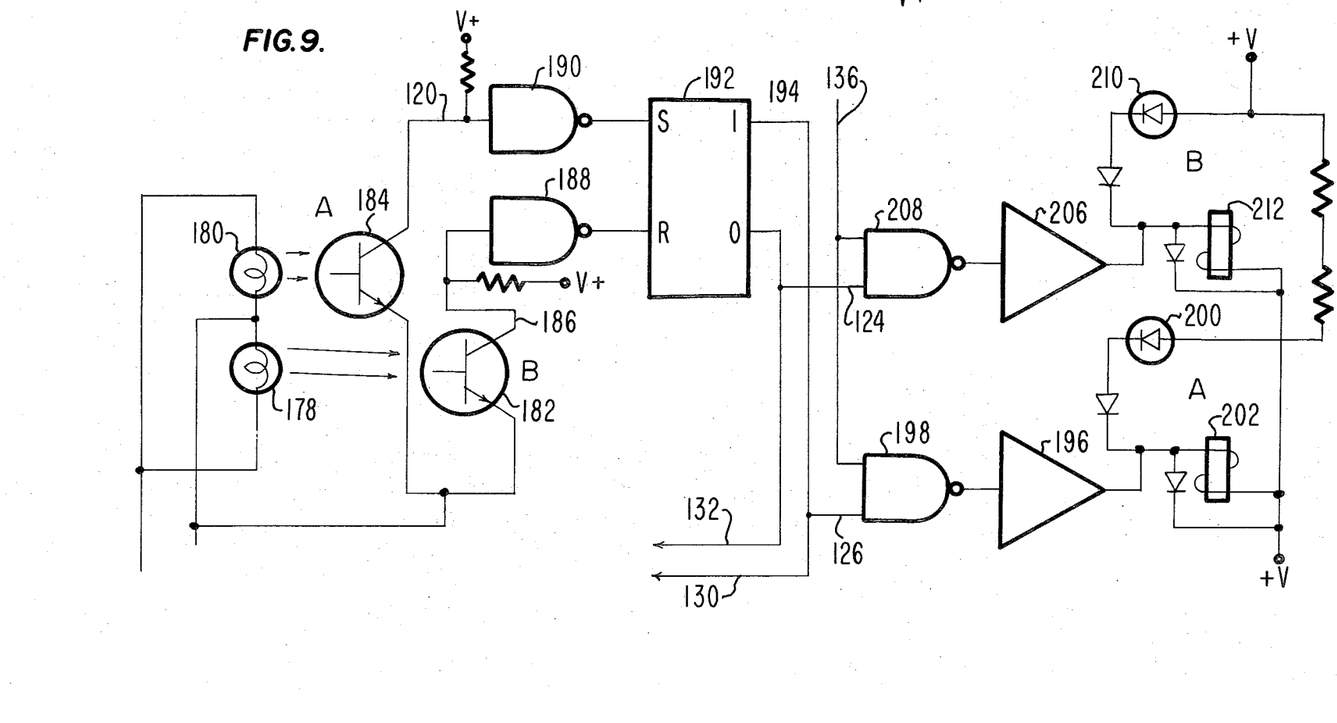
FIG. 9 is a schematic of the switch logic and torque control circuitry.

In FIG. 9 is illustrated the components that make up the Switch Logic as shown by block 122 of FIG. 5. In FIG. 9 the photocells are represented by the two light sources 178 and 180 and two light sensitive transistors 182 and 184. These elements represent photocell A, 116 of FIG. 5, and photocell B, 118 of FIG. 5 which in turn represent photocells 42 and 40 of FIG. 2. At the starting point for the pull test utilized in this example the actuator arm 14 will be covering point A, 42 of FIG. 2 thereby producing a high signal on line 120 and in a similar manner light will be able to get to transistor B 182 thus allowing the current to flow and producing a low signal on line 186. The signals on lines 120 and 186 are then inverted by the gates 188 and 190 for inputs into flip-flop 192. At the start of the pull test the flip-flop 192 will be in a set condition with a high signal on line 194 which serves to activate amplifier 196 through gate 198 thereby causing the magnetic clutch to apply torque "A". At this point it should be mentioned that there will be a high signal on line 136 as will be further explained in the discussion of the DELAY 2 circuitry of FIG. 11. When this condition is in effect the lamp 200 will be lit and the current will be flowing to the circuit 202 thereby producing torque "A" on the magnetic clutch. After the actuator arm has moved to point B the transistors 184 and 182 will cause the flip-flop 192 to reset thus putting a high signal on line 124. This in turn will activate the "B" torque through amplifier 206 acting through gate 208. When the B torque is on, current will flow through the lamp 210 and the magnetic torque circuit 212.

Figure 10:
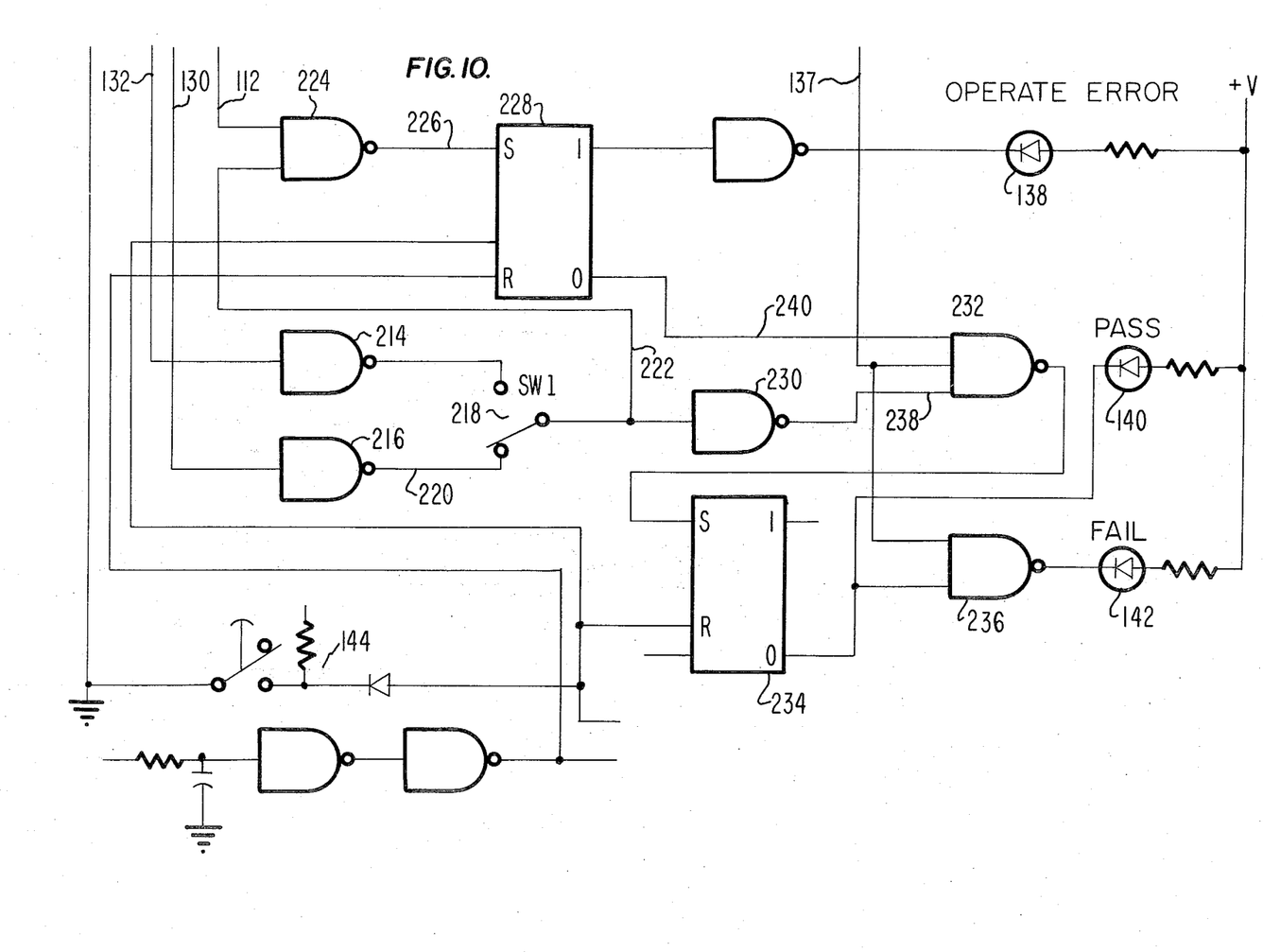
FIG. 10 is a schematic of the pass fail logic circuitry.

The PASS/FAIL LOGIC illustrated by box 114 in FIG. 5 is disclosed in detail in FIG. 10. Taking first the portion of the logic circuitry that controls the Operate Error lamp 138, the two inputs 132 and 130 from the switch logic 122 of FIG. 5 are input to the two inverter gates 214 and 216. The output from these two inverter gates is directed to the SW1 switch 218. It should be noted that it is this switch that will allow an operator to select either a push or a pull test on the solenoid by altering the logic of the PASS/FAIL LOGIC. In selecting a push or pull test the appropriate direction of rotation of the motor 4 should also be selected. Continuing the assumption that the circuitry is set for a pull test, the switch 218 will be set as shown in FIG. 10, i.e. connecting line 220 with line 222. During the first part of the pull test the line 130, as indicated in the discussion of the switch logic 122 of FIG. 5, will have a high value thereby causing a low value on the line 222. Line 222 then becomes one of the inputs to the NAND gate 224. If the predetermined time for the solenoid armature to move the actuator arm to point B has elapsed without actually having done so, the line 222 will remain high and a positive signal will be generated in the Solenoid Timer 110 and conveyed over line 112 to the NAND gate 224. At this point the NAND gate 224 will produce a zero output on line 226, setting the flip-flop 228 and thereby causing the Operate Error lamp 138 to light. The high signal on line 222 has an additional effect caused by the inverter 230 which inverts the signal producing a zero on the NAND gate 232. This will tend to keep the output of the NAND gate 232 high tending to keep the flip-flop 234 in a reset condition. If the flip-flop 234 is reset, thus producing a high value on the NAND gate 236, an end of signal test from the DELAY 2 circuitry over line 137 will tend to cause the NAND gate 236 to go to zero causing the Fail lamp to light. In summary, it can be seen that unless the actuator on moves to position B within the designated time, first the Operate Error light 138 will light and then at the end of the test period the Fail light 142 will light.

Assuming at this point that the actuator on has in fact moved to point B, 36 of FIG. 2, within the specified amount of time, the signal on line 130 will go high thus producing a low signal on line 222. This low signal on line 222 will then be inverted into a high signal by the inverter 230, placing a high input into the NAND gate 232 on line 238. Since it is assumed that the actuator arm has reached point B in the required amount of time, flip-flop 228 will remain in a reset condition thereby holding a high value on line 240 of the NAND gate 232. When the time for the entire test has elapsed, a positive signal will be received over line 137 thereby having the effect of causing the NAND gate 232 to output a low signal resetting flip-flop 234. When flip-flop 234 has been reset, a low value will be on line 242 thus permitting the Pass lamp to light indicating that the solenoid has passed all of the appropriate tests. On the other hand, if the flip-flop 234 is not reset within the allocated time for the test, the positive signal on line 137 will cause the NAND gate 236 to permit the Fail lamp 142 to light.

Figure 11:
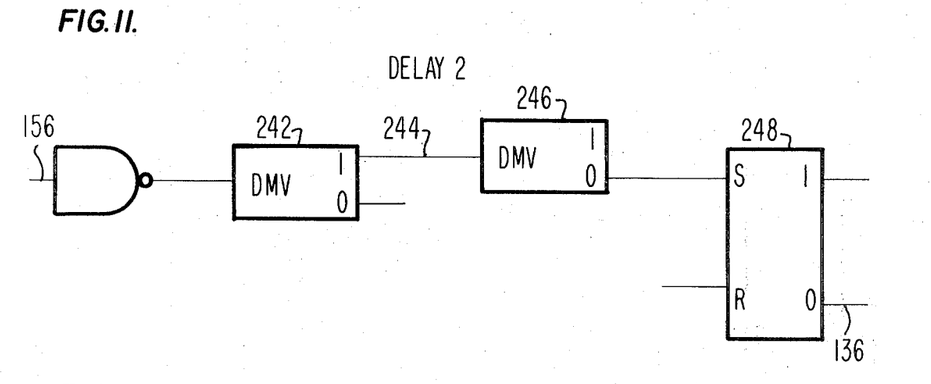
FIG. 11 is a schematic of the second time delay circuitry.

The last portion of logic circuitry to be discussed in this disclosure of the preferred embodiment is the DELAY 2 logic circuitry 134 of FIG. 5. This logic serves primarily to generate a single signal indicating when the test is over. The circuit elements that make up this portion of the solenoid tester logic are shown in FIG. 11. Upon receiving a positive signal from the DELAY 1 circuitry 104 on line 156 the first delay multivibrator 242 will provide a positive signal on line 244 for approximately 30 milliseconds thereby allowing torque "B" to build to its full value. When this time has elapsed, the second delay multivibrator 246 will cause the flip-flop 248 to set, thus generating a low signal on line 136. As can be seen from FIG. 5, it is the signal on line 136 that will terminate the test of the solenoid and reset portions of the circuitry for the next test. After the flip-flop 248 has been reset, the low signal on line 136 will cause the NAND gate 250 of FIG. 8 to produce a high signal on line 137 which will indicate to the PASS/FAIL LOGIC that the test is completed. In addition, it will cause a zero signal on line 252 thereby lighting the End Of Test lamp 254 of FIG. 8 indicating to the operator that the test has been completed.

While the preferred embodiment of both the apparatus and circuitry of the automatic solenoid test system has been described in detail, it will be understood that various modifications may be made by those skilled in the art without departing from the true spirit and scope of the invention as defined by the appended claims.

What is claimed is:

1. An automatic solenoid test system comprising:
a frame;
a fixture support member pivotally attached to said frame and rotatable into a vertical or horizontal position;
a fixture disposed to said fixture support member for securing the solenoid under test;
a drive motor secured to said frame;
a magnetic clutch secured to said frame and driven by said drive motor;
a force transmitting member disposed at one end to said magnetic clutch and disposed at the other end to the armature of the solenoid under test, operative to translate the torque of said drive motor into a load upon the solenoid in cooperation with said magnetic clutch;
circuit means for controlling said motor, said magnetic clutch and operative to test the response of the solenoid against predetermined specifications; and
indicating means for indicating if the solenoid passed the test.

2. The solenoid test system of claim 1 wherein said motor is a constant speed reversible electric motor.

3. The solenoid test system of claim 1 wherein said fixture includes:
adjustment means so as to facilitate the securing of solenoids with a plurality of physical dimensions;
positioning means for positioning said fixture on said fixture support means to provide for a plurality of varying types of solenoids and to provide for accurate alignment of said force transmitting member.

4. The solenoid test system of claim 3 wherein said fixture is additionally provided with dial indicator means for adjusting the gap of the solenoid under test.

5. The solenoid test system of claim 1 wherein the motion of the armature of the solenoid is translated through said force transmitting member to an actuator arm disposed on said magnetic clutch wherein the motion of the armature is measured by one or more limit switches responsive to said actuator arm.

6. The solenoid test system of claim 1 wherein said circuit means includes:
a plurality of time delay circuits;
solenoid control circuitry responsive to said time delay circuits;
torque control logic for controlling said magnetic clutch; and
pass-fail logic circuitry responsive to said time delay circuits and said torque control logic to generate signals indicating the response of the solenoid.

7. A solenoid test apparatus comprising:
a support structure;
a source of rotational energy;
conversion means responsive to said source of rotational energy, secured to said support structure, for converting the rotational energy into a linear force;
force transmitting means responsive to said conversion means, secured to said support structure, for applying said linear force to the solenoid under test; and
control means for controlling the solenoid under test and the application of said linear force to the solenoid.

8. The solenoid test apparatus of claim 7 wherein said support structure includes:
a frame for maintaining in an operative relationship said conversion means and said force transmitting means; and
a fixture disposed to said frame for securing the solenoid under test.

9. The solenoid test apparatus of claim 8 wherein said fixture includes a fixture support member for supporting said fixture wherein said fixture support member is pivotally attached to said frame and rotatable into a plurality of positions.

10. The solenoid test apparatus of claim 7 wherein said source of rotational energy is an electric motor.

11. The solenoid test apparatus of claim 7 wherein said conversion means is a magnetic clutch driven by said source of rotational energy.

12. The solenoid test apparatus of claim 11 wherein said force transmitting means is a connecting arm disposed at one end to said magnetic clutch and disposed at the other end to the armature of the solenoid under test.

13. A control circuit for a solenoid test apparatus comprising:
a control circuit;
a solenoid control circuit responsive to said control circuit;
a torque control circuit responsive to said control circuit for controlling the force applied to the solenoid under test;
a solenoid timer circuit responsive to said control circuit for measuring the time response of the solenoid under test;
logic circuitry responsive to said timer circuit and responsive to said control circuit for indicating whether the solenoid has passed or failed the test.

14. The control circuit of claim 13 wherein said control circuit includes:
a first delay circuit for triggering said solenoid timer circuit and said solenoid control circuit;
a second delay circuit responsive to said first delay circuit for indicating to said logic circuitry the end of test.

15. The control circuit of claim 13 wherein said torque control circuit includes switch logic that is responsive to the position of the solenoid armature.

16. The control circuit of claim 15 wherein said switch logic includes photoelectric means for determining the position of the solenoid armature.

17. The control circuit of claim 13 wherein said logic circuitry includes indicator means for indicating to an operator whether the solenoid has passed or failed the test.

* * * * *